United States Patent [19]
Seibold et al.

[11] Patent Number: 6,163,578
[45] Date of Patent: Dec. 19, 2000

[54] BUS STATION AND BUS SYSTEM

[75] Inventors: Jochen Seibold, Tuebingen; Berthold Elbracht, Reutlingen; Peter Schaedler, Ludwigsburg, all of Germany

[73] Assignee: Robert Bosch GmbH, Stuttgart, Germany

[21] Appl. No.: 09/007,111

[22] Filed: Jan. 14, 1998

[30] Foreign Application Priority Data

Oct. 6, 1997 [DE] Germany ............... 197 44 099

[51] Int. Cl.[7] .................................. H04L 25/00
[52] U.S. Cl. ............................................. 375/257
[58] Field of Search ................ 375/257; 307/10.1; 361/18, 102; 201/45, 36

[56] References Cited

U.S. PATENT DOCUMENTS

| | | | |
|---|---|---|---|
| 3,753,001 | 8/1973 | Hiroshima et al. | 307/10 R |
| 5,216,586 | 6/1993 | Saito | 363/49 |
| 5,550,463 | 8/1996 | Coveley | 323/300 |
| 5,883,774 | 3/1999 | Kida et al. | 361/58 |

*Primary Examiner*—Tesfaldet Bocure
*Assistant Examiner*—Khai Tran
*Attorney, Agent, or Firm*—Kenyon & Kenyon

[57] ABSTRACT

A bus station and a bus system in which two bus stations are connected by at least one bus conductor. Messages are transmitted via a current flowing over the bus conductor. The bus station is supplied with operating current over the bus conductor. For this purpose, an energy storage device stores operating energy. In order to transmit messages, the bus station closes the switch and thus generates a current flow, which discharges the energy storage device of the bus station via the switch and resistor. The station transmits messages by causing the current to flow in the opposite direction by closing the switch. In order to prevent the energy storage device from discharging, the switch is opened.

10 Claims, 1 Drawing Sheet

BUS STATION AND BUS SYSTEM

BACKGROUND INFORMATION

Bus stations are known that are supplied with the required operating power via bus conductors, the energy then being stored in an energy storage device. The exchange of messages through current flows is also known.

SUMMARY OF THE INVENTION

The bus station according to the present invention has the advantage that power drainage from the energy storage device can be kept low. The energy storage device can therefore have a compact design, which allows the storage device to be more rapidly charged via the bus conductors in addition to resulting in reduced costs. The bus system according to the present invention has the advantage that current signals traveling in different directions can be evaluated in a particularly simple manner.

The storage device advantageously comprises a capacitor electrically arranged between the at least one bus conductor and a ground terminal. The ground terminal is advantageously designed as a second bus conductor to reduce weight imbalance. To detect the signals on the bus conductors, a resistor and a comparator are provided, the comparator detecting a voltage drop across the resistor. Current signals can be generated on the at least one bus conductor by using a second switch. The intensity of the current signal is set to a certain value using a current source connected in series with the second switch. The first and second switches are designed so that only one of the two can be open at any given time. Power drainage from the storage device when the bus station itself generates current signals on the conductors is prevented through this measure.

DETAILED DESCRIPTION

Figure 1:
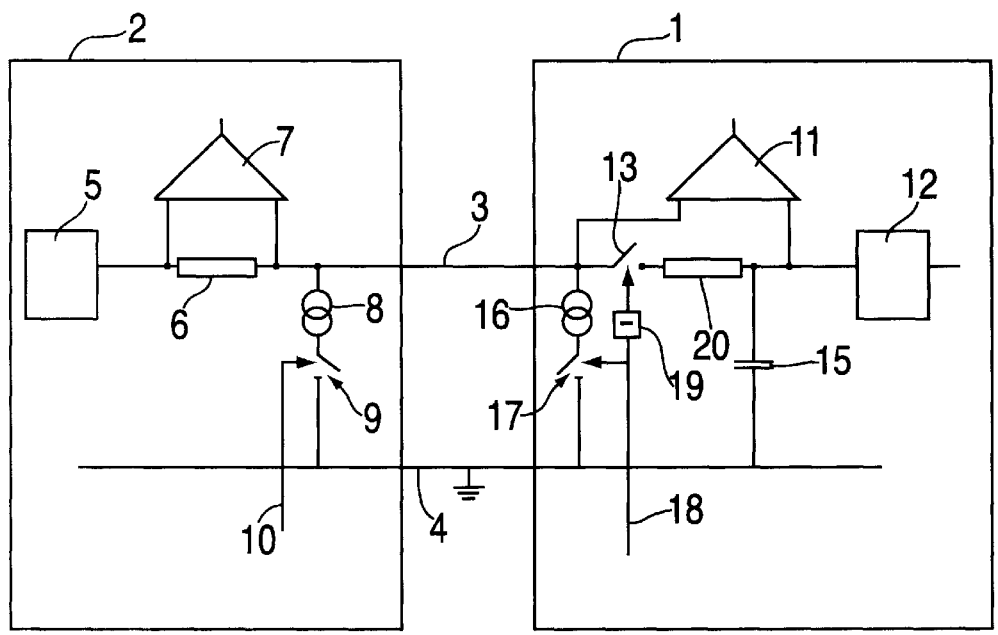
FIG. 1 shows a first and a second bus station.

FIG. 1 shows a bus system with a first bus station 1 and a second bus station 2, connected by bus conductors 3 and 4. Bus connector 4 is connected to the ground. Bus station 2 has a voltage source 5 connected to an external power supply (not shown here). Voltage source 5 is connected to bus conductor 3 via a resistor 6. Terminals of a comparator 7, with which the voltage drop across resistor 6 can be measured, are arranged on both sides of resistor 6. Furthermore, a switch 9, connected in series with a power source 8, is provided in bus station 2. Thus, when switch 9 is closed, a current flows in bus station 2 between bus conductors 3 and a ground terminal, formed by bus conductor 4, whose absolute value depends on current source 8. A current is similarly caused to flow on bus conductor 3. A control line 10 is shown here to trigger switch 9; a switching signal is generated by a control logic not illustrated to trigger switch 9. A switch 17 with a current source 16 connected in series is provided in bus station 1. Thus, a current flow can be produced in bus station 1 between bus conductors 3 and ground terminal 4 by closing switch 17. Furthermore, bus conductor 3 in bus station 1 is connected to a terminal of a switch 13. Another terminal of switch 13 is connected to a terminal of a resistor 20. The other terminal of resistor 20 is connected to a voltage regulator 12 and a terminal of a capacitor 15. The other terminal of capacitor 15 is connected to ground terminal 4. The other terminal of resistor 20 is also connected to an input of a comparator 11. The other input of comparator 11 is connected to bus conductor 3. Another switching line 18 is also provided, over which signals can be sent to trigger switches 17 and 13 by control logic not illustrated. By using an inverter 19, it is ensured that switches 13 and 17 are always controlled with opposite polarities, i.e., when switch 17 is closed, switch 13 is open, and when switch 17 is open, switch 13 is closed (transient states or indefinite switching states are not taken into account).

The two bus stations 1, 2 shown in FIG. 1 differ regarding their power supplies. Bus station 2 has a voltage regulator 5, connected to an external power supply, for example, the battery of a motor vehicle. Thus bus station 2 has additional conductors providing the power supply. Bus station 1 differs from bus station 2 in that bus station 1 is supplied with the required operating power via bus conductors 3, 4. Therefore bus station 1 has no additional conductors to the outside for supplying power. Therefore bus station 1 depends on bus station 2 for its power supply. For this reason, in the following, bus station 2 will be referred to as the central station and bus station 1 as the peripheral station 1. Central station 2 can be, for example, a central device for triggering an air bag. Peripheral station 1 can be, for example, a peripheral acceleration sensor or a peripheral air bag triggering element.

Three operating states are distinguished for the description of the bus system's operation that follows. In a first, or idle, operating state, no messages are exchanged between the central station and the peripheral station (operating state A in FIGS. 2 through 4). In a second operating mode, central device 2 sends messages to peripheral station 1 (operating state B in FIGS. 2 through 4). In a third operating mode, peripheral device 1 sends messages to central device 2 (operating mode C in FIGS. 2 through 4).

Idle Mode

In the idle mode, switch 9 of central device 2 and switch 17 of peripheral device 1 are open, so that no current flows between conductors 3 and 4 through these switches. Since switch 17 is open, switch 13 is closed. Then bus conductor 3 receives an operating voltage through voltage regulator 5 and resistor 6. This operating voltage is then also applied to voltage regulator 12 of peripheral station 1 across closed switch 13 and resistor 20. Voltage regulator 12 generates from the voltage applied to it an operating voltage for operating peripheral station 1. When the peripheral station is used, for example, as a peripheral acceleration sensor, peripheral station 1 also has an acceleration sensor, first analyzing circuits for the sensor signal, and a microcontroller for processing the sensor signals and producing the appropriate information to be transmitted via the bus.

A certain current flow is required to operate these components, which then must also flow across bus conductors 3 and 4. The current flowing over bus conductor 3 produces voltage drops on resistors 6 and 20, which are detected by comparators 7 and 11, respectively. The non-inverting input of comparator 7 is, for example, connected between voltage regulator 5 and resistor 6, and the inverting input of comparator 7 is connected between resistor 6 and bus conductor 3.

Figure 2:
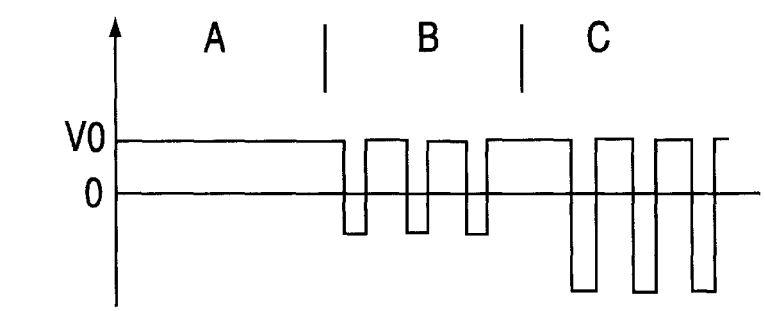
FIG. 2 shows the voltage drop across the resistor of the first bus station.
Figure 3:
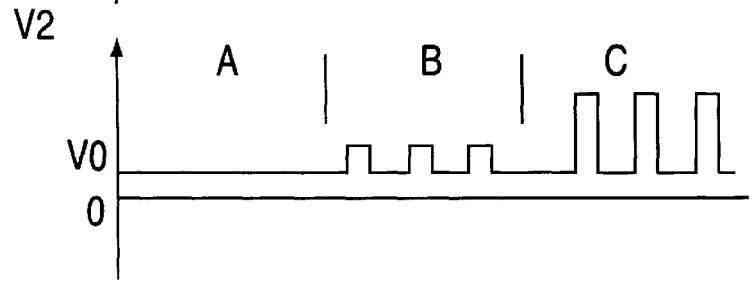
FIG. 3 shows the voltage drop across the resistor of the second bus station.

The voltage drop V2 across resistor 6 is illustrated in FIG. 3. This voltage, denoted as V0 in FIG. 3, does not vary during the idle mode A. There is also a voltage drop V1 across resistor 20, as shown in FIG. 2. The non-inverting input of comparator 11 is here connected between bus conductor 3 and resistor 20, and the inverting input of comparator 11 is connected between resistor 20 and voltage regulator 12. Here as well, the idling voltage V0 does not vary during the idle mode A; the idling voltage V0 across resistor 20 does not need to be the same as idling voltage V0 across resistor 6.

Figure 4:
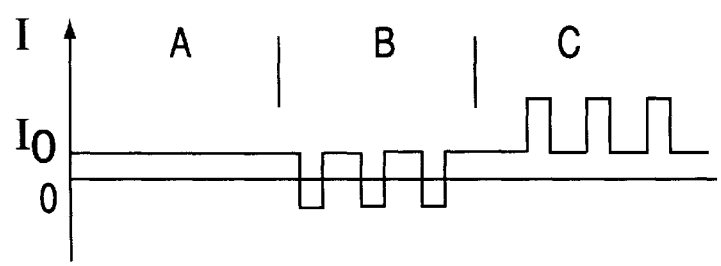
FIG. 4 shows the currents flowing over the bus conductor.

In FIG. 4, current flow I across bus conductor 3 is shown; an idling current I0, equal to the current consumption required to operate the components of peripheral station 1, flows in idle state A. Thus, during the idle state, the bus conductors are only used to supply the peripheral station with the required operating voltage.

In order to also ensure power supply to peripheral station 1 during data transmission, peripheral station 1 has a capacitor 15 serving as an energy storage device. Since capacitor 15 is to a certain degree isolated from the voltage states on the bus conductors by resistor 20, peripheral station 1 can, for a certain period of time, also be supplied by capacitor 15 if bus conductors 3 and 4 are short-circuited. Of course, energy storage devices other than capacitors 15 can also be used, for example, coils. The idle mode was described here assuming that capacitor 15 is charged, which, of course, is not the case when the bus system is turned on for the first time. When the system is turned on for the first time, increased currents will initially flow until the energy storage device, formed by capacitor 15, is charged.

In the following, the transmission of messages from central station 2 to peripheral station 1 is discussed (operating state B in FIGS. 2 through 4). For the transmission of messages, switch 9 is actuated in central station 2 by appropriate switching signals over switching conductor 10. When switch 9 is closed, conductors 3 and 4 are electrically connected, and the current is limited by current source 8. Since switch 17 is open and switch 13 is closed in peripheral device 1, this current is supplied through current source 8 and switch 9 not only from current regulator 5, but also from energy storage device 15 of peripheral device 1. Thus closing switch 9 results in a current flow from capacitor 15 through resistor 20 to central device 2. The voltage drop across resistor 20 thus changes polarity compared to the idle state.

This is shown in FIG. 2 for three successive operations of switch 9 in operating mode B. As can be seen, the voltage drop V1 across the resistor is drawn from the positive area starting with the positive idling voltage V0 to the negative area each time switch 9 is briefly actuated. Such a change in the voltage drop across resistor 20 can thus be easily detected by a comparator 11, whose switching threshold is 0 V. Other switching thresholds in the slightly positive or slightly negative area can also be used if this is convenient and desirable for any reason. The analysis of the currents flowing through conductor 3 in FIG. 4 also shows for the operating mode B a change in polarity when switch 9 is actuated. While in the idle state a current flows from central device 2 to peripheral device 1, a current flow in the opposite direction from peripheral device 1 to central device 2 results from actuating switch 9.

The graphs of FIGS. 3 and 4 assume an ideal situation where capacitor 15 has a very large storage capacity, which shows no detectable reduction in the amount of energy stored when switch 9 is briefly actuated. This is, of course, not actually the case, so FIGS. 2 through 4 show an ideal situation. As can be seen in FIG. 3, actuating switch 9 also causes an increased current to flow across resistor 6, so that there as well the voltage V2 detected by the comparator changes. These, of course, are not perceived by central station 2 as signals and are ignored.

Messages are sent from peripheral station 1 to central station 2 by peripheral station 1 closing switch 17 with appropriate signals sent over switching line 18. Switch 13 opens at the same time, so that capacitor 15 is no longer connected to conductor 3. A current flows through switch 17 between bus conductor 3 and bus conductor 4; the intensity of this current is defined by current source 16. In the following, it is assumed that the current defined by current source 16 is greater than idling current consumption I0 of peripheral station 1, so that an increased current flows through bus conductor 3 when switch 17 is closed. FIG. 4 shows how the current increases during this operating mode C when switch 17 is actuated three times.

In central station 2, the current flow through resistor 6 also increases due to the increased current flow on bus conductor 3 caused by peripheral station 1, so that the voltage drop V2 across resistor 6 as switch 17 is actuated also increases. This is shown in FIG. 3. By analyzing voltage drop V2, bus station 2 can thus determine when switch 17 was closed in peripheral station 1. For this purpose, comparator 7 has a switching threshold that is slightly higher than voltage drop V0 across resistor 6 in the idle mode. It is important here that the operating current I0 in the idle mode should differ from the current defined by current source 16. FIG. 4 shows that the current consumption by current source 16 is greater than idling current I0, so that the current increases on bus conductor 3. As shown in FIG. 3, this results in an increase in voltage drop V2 across resistor 6. If switch 13 is not provided, the increased current defined by current source 16 causes capacitor 15 to rapidly discharge, since this capacitor, unless isolated by switch 13, must provide not only operating current I0 while switch 17 closes, but also part of the current through current source 16. Of course, this will also reduce the current signal to be detected in central station 2.

By isolating capacitor 15 while switch 17 is actuated, an excessively rapid discharge of capacitor 15 is avoided. Thus, by using isolating switch 13, capacitor 15 can be made smaller and thus less expensive. This is important particularly if the messages from central station 2 to peripheral station 1 are very short, while the messages from peripheral station 1 to central station 2 are considerably longer. When used in conjunction with a central air bag triggering device (central station 2) and a peripheral acceleration sensor (peripheral station 1), the short message of the central device may consist of an alive signal, for example, to which the peripheral station sends back an appropriate message. The alive signal may consist of a single bit, for example, so that capacitor 15, providing the power for data transmission from central station 2 to peripheral station 1, is only slightly discharged. Conversely, the peripheral station sends a constant measuring data current requiring a plurality of bits and therefore a plurality of actuations of switch 17. This data traffic, however, requires no power from capacitor 15, since the power required is provided exclusively by central station 2.

The peripheral stations according to the present invention can therefore be used to particular advantage if the data traffic from the peripheral station to the central station is considerably greater than the data traffic from the central station to the peripheral station. If the data traffic from central station 2 to peripheral station 1 causes a detectable discharge of capacitor 15 only due to the power consumption of the peripheral station, it must be ensured, by having sufficient idle phases between the individual actuations of switch 9 through a suitable control in central station 2, that a sufficient charge of capacitor 15 is always available.

Since the current defined by current source 16 must only be different from the idling current I0 in order to generate a signal when switch 17 is actuated, it would also be possible, of course, to make the current thus defined smaller than idling current I0. Then only the range from I0 to no current flow would be available as the maximum signal difference. Since, on the other hand, I0 should be as small as possible, i.e., the idling current consumption of the peripheral device should be small so that voltage regulator 5 does not need to have a complex design and capacitor 15 may be as small as possible, the signal difference that can thus be used is relatively small. It is therefore better if the current defined by current source 16 is greater than the idling current I0, since this way a stronger signal is available.

Since capacitor 15 is isolated by the opening of switch 13 when switch 17 is actuated, the current defined by current source 16 is provided exclusively by voltage regulator 5. Therefore a clear signal is obtained if the difference between the current defined by current source 16 and idling current I0 is small. Without this isolation by switch 13, current source 16 would have to define a much higher current flow in order to obtain a similarly clear signal in central station 2. Of course, the smaller the current defined by current source 16, the smaller the power loss in the peripheral device. Furthermore, the idling current I0 is not constant over time as shown in the idealized representation in FIGS. 2 through 4, but may vary considerably. Thanks to the isolating action of switch 13, the current flowing in conductor 3 is independent of these variations, since the current flow through current source 16 can be accurately defined.

Capacitor 15 is from time to time isolated from the signals in bus conductor 3 by the isolating action of switch 13. Therefore, no capacitor discharge takes place during the transmission operation of peripheral station 1, so that capacitor 15 does not have to be overdimensioned. Furthermore, the input voltages of voltage regulator 12 are not affected by steep signal flanks even during this operating phase, so that this voltage regulator can also have a simpler design and/or the operating voltage of peripheral device 1 is subject to less fluctuation. In particular, any additional filter capacitors can be kept small or omitted altogether. Furthermore, the resistance of resistor 20 can be low, so that a particularly rapid recharge is achieved with low supply voltages, in conjunction with the equally low degree of discharge of capacitor 15.

The lower current flow caused by current source 16 also diminishes electromagnetic interference radiations.

As can be seen in FIG. 2 in operating phase C, when switch 17 is closed, the voltage drop V1 across resistor 20 is also affected. This signal is, however, ignored by the peripheral station. With other arrangements of the inputs of comparator 11 in relation to switch 13 and resistor 20, or other arrangements of switch 13 and resistor 20, other signal differences can be produced on the comparator when switch 17 is actuated and switch 13 is opened. For example, the tap of the comparator in FIG. 1 may not be directly connected to bus conductor 3, but a signal can be picked up between switch 13 and resistor 20. Voltage V1 would then not land in the negative area when switch 13 is opened, but would at most go back to zero. Furthermore, the arrangement of resistor 20 and switch 13 may also be reversed in comparison with FIG. 1.

In order to ensure that switch 13 and switch 17 cannot be open or closed at the same time, an inverter 19 is provided in the corresponding switching lines 18. Alternatively, the inverter can be provided in the line for switch 17 or the switching response of the switch can be set so that, for the same signals applied, only one switch can be open at a time.

Bus conductor 4 can also be omitted as long as each bus station 1, 2 has its separate ground terminal. The ground potential on such separate terminals is, however, usually subject to greater fluctuations.

The bus system described herein can, of course, be also used with more than two bus stations, in which case one central station supplies operating current for a plurality of peripheral stations. Of course, the usual measures must be taken in this case to prevent simultaneous access to the bus conductors by more than one station. A simple measure may, for example, consist of the individual peripheral stations only attempting to transmit messages over the bus conductor at predefined intervals upon receipt of an excitation signal from the central station.

What is claimed is:

1. A bus station comprising:
    a storage device for storing electric energy;
    a first switch coupled between the storage device and a terminal for at least one bus conductor;
    a resistor coupled in series with the first switch;
    a comparator for detecting a voltage drop across the resistor; and
    means coupled to the comparator, for disabling a backward flow of the electric energy from the storage device to the at least one bus conductor by opening the first switch in at least one first operating state of the bus station and for enabling the backward flow of the electric energy from the storage device to the at least one bus conductor in at least one second operating state of the bus station.

2. The bus station according to claim 1, wherein the storage device includes a capacitor coupled between the terminal for the at least one bus conductor and a ground terminal.

3. The bus station according to claim 2, wherein the ground terminal is coupled to an additional bus conductor.

4. The bus station according to claim 1, further comprising:
    a voltage regulator coupled to the storage device for delivering an operating voltage for supplying the bus station.

5. A bus station, comprising:
    a storage device for storing electric energy, the storage device including a capacitor coupled between a terminal for at least one bus conductor and a ground terminal;
    a first switch coupled between the storage device and the terminal for the at least one bus conductor;
    means for disabling a backward flow of the electric energy from the storage device to the at least one bus conductor by opening the first switch in at least one first operating state of the bus station and for enabling the backward flow of the electric energy from the storage device to the at least one bus conductor in at least one second operating state of the bus station;
    a second switch coupled between the at least one bus conductor and the ground terminal, a current flowing between the at least one bus conductor and the ground terminal when the second switch is closed.

6. The bus station according to claim 5, further comprising:
    a current source coupled in series with the second switch, an intensity of the current being determined by the current source when the second switch is closed.

7. The bus station according to claim 5, wherein one of the first and second switches is open and another of the first and second switches is closed.

8. A bus system comprising:

a first bus station and a second bus station, at least one of the first bus station and the second bus station including
- a storage device for storing electric energy,
- a first switch coupled between the storage device and a terminal for at least one bus conductor,
- a resistor coupled in series with the first switch,
- a comparator for detecting a voltage drop across the resistor, and
- means coupled to said comparator, for disabling a backward flow of the electric energy from the storage device to the at least one bus conductor by opening the first switch in at least one first operating state of the bus station and for enabling the backward flow of the electric energy from the storage device to the at least one bus conductor in at least one second operating state of the bus station;

wherein the at least one bus conductor couples the first bus station to the second bus station, and wherein messages are exchanged between the first and second bus stations via a current flowing over the at least one bus conductor, a direction of the current depending upon which of the first and second bus stations is transmitting.

9. The bus system according to claim 8, wherein at least one of the first and second bus stations is supplied with an operating current over the at least one bus conductor.

10. The bus system according to claim 9, wherein the backward flow of energy from the energy storage device to the at least one bus conductor is selectively enabled and disabled by a selective opening and closing of the first switch.

* * * * *